United States Patent

Kerchouche et al.

[11] Patent Number: 6,096,221
[45] Date of Patent: Aug. 1, 2000

[54] PROCESS FOR THE TREATMENT OF WATER BY INJECTION OF OZONE AND CARBON DIOXIDE

[75] Inventors: Kera Kerchouche, Saint-Ouen; Vincent Boisdon, Maisons Laffitte, both of France

[73] Assignee: Air Liquide Sante ( International), Paris, France

[21] Appl. No.: 09/137,238

[22] Filed: Aug. 20, 1998

[30] Foreign Application Priority Data

Aug. 20, 1997 [FR] France ................................. 9710503

[51] Int. Cl.[7] ................................................. C02F 1/00
[52] U.S. Cl. ..................... 210/696; 210/742; 210/743; 210/750; 210/752; 210/760; 210/764
[58] Field of Search ................................. 210/696–701, 210/739, 742, 743, 752, 760, 764, 765, 96.1, 143, 750

[56] References Cited

U.S. PATENT DOCUMENTS

| 4,172,786 | 10/1979 | Humphrey et al. ........................ 422/9 |
| 4,931,187 | 6/1990 | Derham et al. .......................... 210/662 |
| 5,085,809 | 2/1992 | Stirling ..................................... 261/77 |
| 5,393,417 | 2/1995 | Cox ....................................... 210/96.1 |
| 5,415,783 | 5/1995 | Johnson et al. ......................... 210/699 |
| 5,591,349 | 1/1997 | Ikeda et al. ............................. 210/760 |
| 5,609,766 | 3/1997 | Schneider et al. ...................... 210/662 |
| 5,611,933 | 3/1997 | Cleveland .............................. 210/696 |
| 5,720,884 | 2/1998 | Wallace et al. ......................... 210/743 |
| 5,820,541 | 10/1998 | Berlanga Barrera .................... 588/258 |

FOREIGN PATENT DOCUMENTS

| 0 567 860 | 11/1993 | European Pat. Off. . |
| 0 701 972 | 3/1996 | European Pat. Off. . |
| 44 28 147 | 2/1996 | Germany . |
| 6-142662 | 5/1994 | Japan . |
| WO 95/13989 | 5/1995 | WIPO . |

Primary Examiner—Peter A. Hruskoci
Attorney, Agent, or Firm—Young & Thompson

[57] ABSTRACT

A process and device for treatment of water circulating in a conduit, which water carries microorganisms that must be eliminated and ions susceptible of leading to the formation of deposits on the internal wall of the conduit. To this end, there is injected in the water to be treated effective quantities of ozone and carbon dioxide. Particularly useful to treat the water conduits of a hospital building.

15 Claims, 3 Drawing Sheets

PROCESS FOR THE TREATMENT OF WATER BY INJECTION OF OZONE AND CARBON DIOXIDE

CROSS REFERENCE TO RELATED APPLICATION

This application corresponds to French application 97/10503 of Aug. 20, 1997, the disclosure of which is incorporated herein by reference.

FIELD OF THE INVENTION

The present invention relates to a process and device for the treatment of water flowing in a conduit, which water carries microorganisms that must be eliminated and ions adapted to lead to formation of deposits on the internal wall of said conduit.

BACKGROUND OF THE INVENTION

It is known to subject the water flowing in a conduit or a network of conduits, to treatment adapted to disinfect it, which is to say to eliminate the microorganisms which it carries.

To this end, a first solution consists in introducing into the water chemical agents, such as chlorine or chlorine derivatives. However, this type of chemical agent has several drawbacks.

Thus, once introduced into the water, the latter lead to the formation of biproducts of chlorination, such as organo-chlorine products, which are undesirable substances, whose accumulation in the conduits carrying the water for human consumption, is likely to give rise to problems of public health.

Moreover, it has been noted that chlorine gives rise to internal corrosion of the conduits of the network, thus creating cavities in the walls of the conduits which promote the deposit, growth and propagation of a biofilm of microorganisms.

Moreover, it has been noted that certain pathogenic germs resist the action of chlorine and its derivatives.

An alternative to the use of chlorine derivatives is the use of ozone or an ozonated gas injected directly into the water to be treated.

Thus, the fact of sending ozone into a conduit colonized by bacteria limits the development of these latter and improves the quality of the water. In other words, the ozone permits reducing the living bacterial flora carried by the water to a threshold below the detectable limit. These variable doses used do not give rise to the formation of biodegradable dissolved organic carbon (BDOC), which serves to nourish the bacterial flora; the risks of revival of the microorganisms are hence reduced.

Moreover, the breakdown of the ozone does not lead to subproducts adapted to harm public health and does not give rise moreover to any problem of corrosion of the pipes.

Another problem to which it is necessary to give attention, is that of the progressive deposits on the internal wall of the pipes by deposit on the latter of ions carried by the water. This deposit is greater when the conveyed water is warm because the temperature favors shifting the calco-carbon equilibrium, leading to calcarious deposits.

Such ionic deposits leading to the formation of scale in the pipes are undesirable because on the one hand they give rise to progressive clogging of the pipes and on the other hand they favor and facilitate the implantation and growth of a biofilm of microorganisms.

To limit these scaling phenomena, it is necessary to bring the water to calco-carbonic equilibrium, which is effected in a known manner by either restoring the equilibrium of the water with salt, or, as the case may be, changing the pH.

Conventionally, the re-equilibrating water with salt requires a complex and costly material, whose principal operation is based on ion exchange technique, whilst requiring the use of a large quantity of reagent. If this technique permits solving at least partially the problem of scaling in pipes, it also gives rise to untimely development of microorganisms.

Changing the pH, and hence the calco-carbonic equilibrium toward acid pH, can be carried out itself by introduction into the water to be treated of strong acids, such as 97% sulfuric acid or 35% hydrochloric acid, or a weak acid. However, the use of acid products gives rise to several drawbacks, namely, their handling is difficult and potentially danger for the user, the acids are a source of pollutant ions for the water ($SO_4^{2-}$, $Cl^{-1}$ ions . . . ), the acidity is a cause of corrosion of pipes, the doses added to the water must be very carefully controlled so as to avoid any risk of over or under acidification of the water.

An alternative to the use of acids or salts consists in the dissolution in the water to be treated of carbon dioxide ($CO_2$), which permits reducing the pH of the water effectively, easily and stably.

Moreover, when it is desired to treat water flowing in a pipe, which water carries microorganisms and ions promoting scaling in the pipe, it is recommended to inject ozone ($O_3$) therein, and carbon dioxide ($CO_2$). Thus, in this way, there is a synergetic action of the two gases.

More particularly, the ozone will permit eliminating the microorganisms carried by the water and the $CO_2$ will prevent or slow the formation of scale and hence the deposit of the biofilm of microorganisms on the internal walls of the pipes.

The injection of ozone and carbon dioxide into water to be treated can be carried out either by injecting these two gases independently of each other, or by using a preliminary mixing of them, thus we will speak of simultaneous injection of the two gases.

The field of application of this type of water treatment process is very wide and relates particularly to the hospital field (fighting nosocomial infections due to Legionelle, Pseudomonas . . . ), or generally: the protection of piping against clogging due to scaling and to the deposit of biofilm on their internal walls, and the industrial sector: treatment of water for subsequent processes, combatting clogging of piping and heat exchangers . . . .

Until now, numerous processes disclosing treatment of water with ozone gas and/or carbon dioxide have been described and there can be cited or example EP-A-0 567 860, WO95/13989, U.S. Pat. No. 5,085,809, JP-A-04 90891.

SUMMARY OF THE INVENTION

The object of the present invention is to improve the existing processes so as to permit effective and optimum treatment of water.

Moreover particularly, the object of the invention is a process based on an injection of carbon dioxide ($CO_2$) and ozone ($O_3$) in variable and adjustable proportions as a function of the physico-chemical parameters of the water, such as pH, temperature and flow rate.

The invention thus relates to a process for the treatment of water flowing in a conduit, which water carries microorganisms to be eliminated and ions adapted to lead to a formation of scale on the internal wall of said conduit, in which:

a) at least the flow rate, temperature and inlet pH of the water to be treated are measured;

b) at least the outlet ph of the treated water is measured;

c) a reference pH is determined, from at least one of the parameters measured in step a);

d) the proportion of gas containing carbon dioxide to be injected into the water to be treated is determined, by comparison of the reference pH determined in step c) and of the outlet pH measured in step b);

e) a reference value of ozonation is determined from at least one of the parameters measured in step a);

f) the proportion of gas containing ozone ($O_3$) to be injected into the water to be treated is determined as a function of the reference value of ozonation from step e);

g) the pH of the water is adjusted and at least a portion of the microorganisms that it contains are eliminated, by injecting into the water to be treated the proportion of gas containing ozone determined in step f) and the proportion of gas containing carbon dioxide determined in step d).

As the case may be, the process of the invention can comprise one or more of the following characteristics:

in step a), there is also measured at least one of the parameters of the group consisting of complete alkalimetric titer (CAT) and the hydrotimetric titer (HT);

in step b), there is also measured at least one of the parameters of the group consisting of residual ozone ($RO_3$), residual oxygen ($RO_2$) and the redox potential;

the reference value of ozonation is selected from the group consisting of the treatment rate (TR), the residual ozone ($RO_3$) and the product CxT;

the injection of gas in the water to be treated is carried out by means of dissolution of the gases in water;

after injection of the gases into the water to be treated, at least a portion of the undissolved gas is eliminated by separation means for the undissolved gas;

the undissolved gases are eliminated by means of a vector gas, preferably a vector gas containing nitrogen;

after injection of the gases into the water to be treated, the undissolved gases are recovered;

in step c), the reference pH is determined at least from the temperature and/or the inlet pH of the water to be treated;

in step d), the proportion of gas containing carbon dioxide to be injected into the water to be treated is determined, thereby permitting returning the outlet pH to a value substantially equal to the reference pH;

in step e), the reference value of ozonation is determined at least from the temperature and/or the flow rate of the water to be treated;

in step f), the proportion of ozone to be injected is determined also from at least one of the parameters measured in step b) in the treated water;

the pressure of the water to be treated is maintained in the range of $10^5$ Pa to $10^6$ Pa;

the injection of the gases into the water is carried out in line in a principal conduit or in a branch conduit connected to said principal conduit;

the injection of the gases is carried out in a continuous or sequential manner and preferably in a pipe in which the water to be treated flows with a controlled flow rate;

the at least partial elimination of the microorganisms contained in the water to be treated is carried out within a buffer reservoir located downstream of the injection site of the principal mixture;

the water to be treated is at a temperature below 100° C., preferably comprised between 1° C. and 80° C.;

the pH of the water is adjusted to within the range 6 to 8.

The invention also relates to an installation for the treatment of water flowing in a conduit (11, 11'), to practice the process described above, comprising:

a source of gas containing ozone, a source of gas containing carbon dioxide, means for dissolving in the water to be treated gas containing ozone and/or gas containing carbon dioxide, contact/homogenization means, means for separating undissolved gases, and measuring means.

Preferably, the means for separating undissolved gases are selected from packed columns and centrifugal gas/liquid separators.

The process and/or installation described above is adapted to be used to treat water at a temperature from 1° C. to 80° C., flowing in a conduit in a building, preferably a hospital building, or in a conduit connected to at least one heat exchanger.

The treatment rate (TR) is the quantity of ozone injected in the water to be treated; it is expressed in grams of ozone injected per cubic meter of effluent.

The residual ozone ($RO_3$) is the quantity of ozone dissolved in the water to be treated; it is expressed in grams of ozone dissolved per cubic meter of effluent and can be measured with a dissolved ozone probe or by chemical dosage.

The residual oxygen ($RO_2$) is the quantity of oxygen dissolved in the water to be treated; it is expressed in grams of dissolved oxygen per cubic meter of effluent and can be measured with a dissolved oxygen probe.

The transfer yield (TY) is the quantity of gas actually transferred into the water; it is expressed in percent and is given by the ratio:

$$TY = \frac{\text{quantity of gas injected} - \text{quantity of gas discharged}}{\text{quantity of gas injected}}$$

The product CxT defines the quantity of ozone which permits obtaining effective elimination of the microorganisms, given that this elimination depends both on the concentration of dissolved ozone and on the time of contact between the ozonated water and the microorganisms to be eliminated as a function of the useful water volume of the reactor, in which this operation takes place. Thus, so as to ensure effective treatment of the water, the product CxT can be modified so as to take account of the hydraulic behavior of the reactor or reactors, of the successive stages of reagents. Moreover, according particularly to the nature and the number of the microorganisms, the nature of the disinfectant used (here ozone) and of the quantity of water to be treated, the tables of values of CxT have been established by research organizations working on the treatment of water; there can be cited for example the US EPA. The values of CxT given by these tables serve to dimension the reactors; these latter are hence within the scope of a person skilled in the art.

The calco-carbonic re-equilibriage is a chemical modification, which is to say a correction, of the water. Thus, there are found in water, as a function of the pH and the degree of mineralization, more carbon dioxide in the form of free $CO_2$ or in the form of complexes $Ca(HCO_3)_2$ (calcium bicarbonate) and $CaCO_3$. It follows that when the water contains more free $CO_2$, the latter is more corrosive for the pipes. Conversely, when the water contains more $CO_2$ in the form of complexes, the latter is more apt to form scale in the pipes, in the form of accelerated precipitation of calcium carbonates in the form of scale. However, there remains an equilibrium pH for which the water is neither too corrosive nor too likely to build up scale in the pipes. For example, to return a scale forming water to an equilibrium pH, carbon dioxide can be injected therein so as to decrease the pH and hence thereby to minimize the presence of $CO_3^{2-}$ ions, which have a high tendency to react with the cations $Ca^{2+}$ and $Mg^{2+}$ giving scale, and to increase the presence of $HCO_3^-$ ions which are non-reactive with said $Ca^{2+}$ and $Mg^{2+}$ cations. Thereupon, the complete alkalimetric titre (CAT) reflects the water content of $OH^-$, $CO_3^{2-}$ and $HCO_3^-$, and the hydrotimetric titre (HT) gives the content of ions $Ca^{2+}$ and $Mg^{2+}$.

BRIEF DESCRIPTION OF THE DRAWINGS

The invention will now be described in greater detail with respect to embodiments given illustratively but non-limitatively, and shown in the accompanying drawings, in which.

DESCRIPTION OF THE PREFERRED EMBODIMENTS

Figure 1:
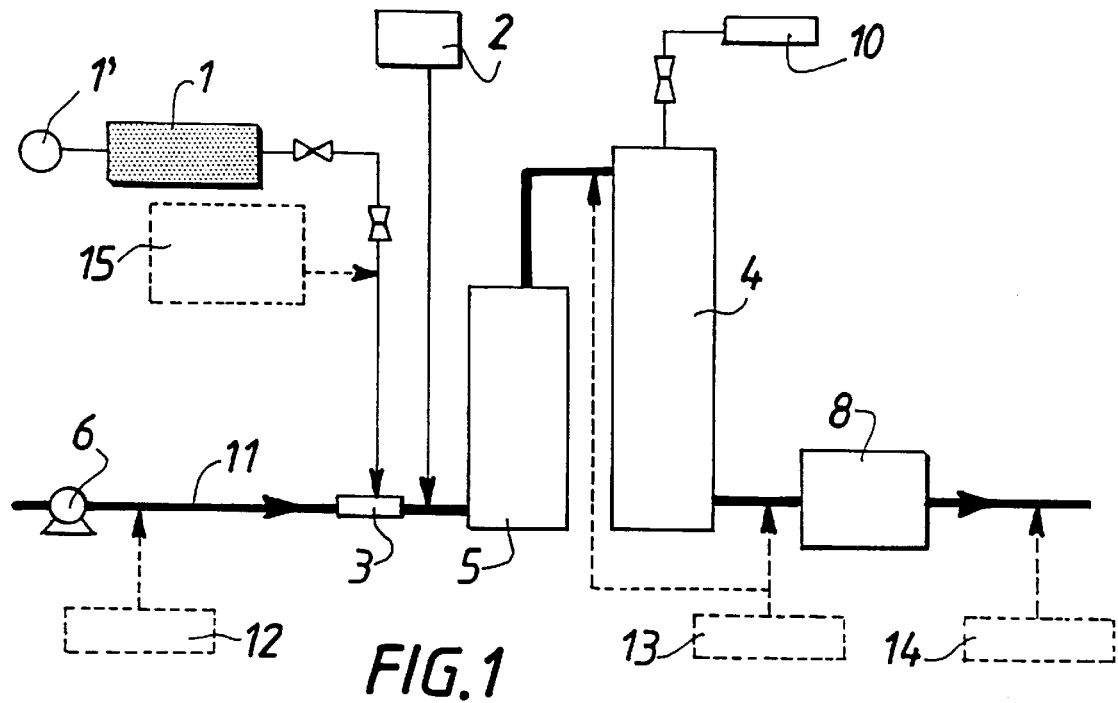
FIGS. 1–6 show six different embodiments of installations for practicing the present invention.

FIGS. 1 shows a linear installation for the treatment of water circulating in a conduit 11, with a substantially constant water flow rate, which water carries microorganisms to be eliminated and ions adapted to form scale on the internal wall of said conduit; the water has been placed under positive pressure by compression means 6.

This installation comprises a source 1 of gas containing ozone ($O_3$), such as an ozonizer, supplied with oxygen by an oxygen source 1', and a source 2 of carbon dioxide ($CO_2$). The source 1 of gas containing ozone or ozonized gas is connected to dissolution means 3, for example a gas/liquid emulsifier, arranged on conduit 11, which permit better dissolution of the ozonized gas in the water. The dissolution means 3 are for example a static mixer, a hydro-injector or a vacuum device of the venturi type.

Moreover, in this case, the injection of carbon dioxide gas ($CO_2$) in the water is carried out directly in the principal conduit 11, downstream of the dissolution means 3.

As the case may be, the injection of gaseous carbon dioxide and ozone can be controlled either by one and the same control module, such as a programmable computer, or by different modules (not shown). It is also possible to provide a remote overall surveillance and control mode for the installation.

The water containing ozone and carbon dioxide then passes through the contact/homogenization means 5, such as a contact reactor, in which the water remains for the time necessary for effective action of the carbon dioxide and ozone dissolved in the water to be treated, so as to re-establish the calco-carbonic equilibrium and to eliminate the microorganisms likely to be found in it, then is directed to the phase separation means 4, such as a gas/liquid separator, permitting separating the undissolved gases contained in the water carried by the conduit 11, namely essentially oxygen ($O_2$), from the carbon dioxide and residual ozone.

After separation, these undissolved gases will be subjected to a thermal or catalytic treatment to eliminate from them residual ozone before being discharged to the atmosphere by outlets (not shown), or are reusable in another treatment step, as well as the oxygen recovered being adapted to be reused particularly for producing the ozone.

Separation means 4 of the phases are, for example, a tangential flow separator or a reactor for separation of phases with control of the water level and the pressure on the escape of undissolved gases.

After its passage through the separation means 4, the water is brought to its utilization locality (not shown), by undergoing preferably a step of chemical deozonization in deozonization means 8, for example by filtration through active carbon, by use of a reactive reductor, such as sodium bisulfite, or by desorption of the undissolved gases by "stripping".

Measuring means 12, arranged upstream of the dissolution means 3, permit determining at the input the parameters indispensable to the good operation of the process of the invention: flow rate of water to be treated, temperature, inlet pH, the CAT and/or the HT. There are then determined from at least one of these parameters:

a reference pH, in general between 6 and 8; the parameters being then preferably the temperature and/or the inlet pH of the water to be treated;

and a reference ozonation value selected from the group comprised by the treatment rate (TR), the residual ozone ($RO_3$) and the product CxT; the parameters then being preferably temperature and/or flow rate of water to be treated, but also the outlet pH of the treated water, the residual ozone ($RO_3$) and/or the residual oxygen ($RO_2$), which are determined at the outlet downstream of the deozonization means 8, by second control means 14.

By comparison of the reference pH and the measured outlet pH, the proportion of a gas containing carbon dioxide ($CO_2$) to be injected into the water to be treated is determined, so as to obtain an outlet pH substantially equal to the reference pH.

Similarly, the proportion of gas containing ozone to be injected into the water to be treated is determined as a function of the reference ozonation value. Then, the pH is adjusted thereby reestablishing the calco-carbonic equilibrium of the water and at least a portion of the microorganisms that it contains are eliminated, by injecting in the water to be treated the effective proportions respectively of gas containing ozone and gas containing carbon dioxide; the injection of gas being controlled and monitored by injection means 15 for gas.

A complementary control of the quantity of ozone dissolved is effected upstream and/or downstream of the separation means 4 by first control means 13.

Preferably, a central pilot module (not shown), such as a programmable computer, controls the whole of the installation: procedure and down time or operating time, sequence of measurements, calculation of the treatment standards . . .

The installation shown in FIG. 1 can be used to treat warm water, which is to say at a temperature between 1 and 100° C., carried by the conduit system of a hospital building.

The circulation of liquid and gaseous fluids with the installation and the control of the pressure, could be carried out in a known manner with the help of apparatus that is conventional for one skilled in the art, such as regulation valves, anti-return valves, pourers, expanders, pressure detectors, flow rate detectors. . . .

Figure 2:
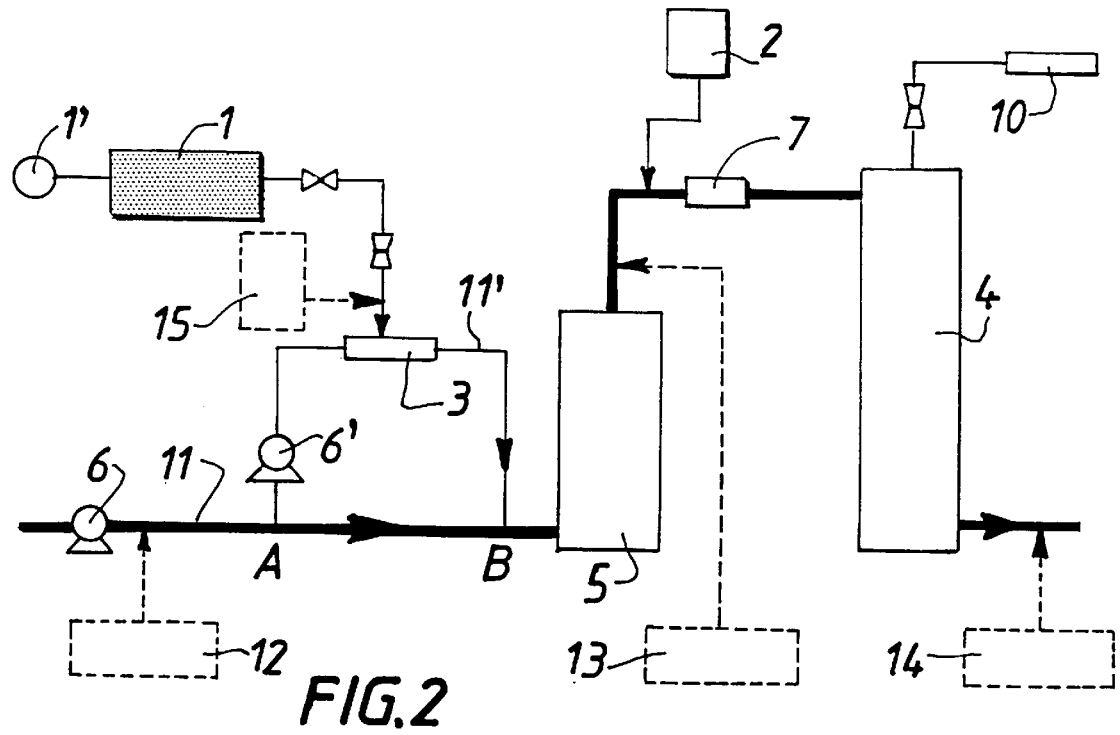

FIG. 2 shows an installation for the treatment of water analogous to that shown in FIG. 1, except that the latter is no longer linear along the principal conduit 11, but is mounted branched from a branch conduit 11' (for common portions: compare FIG. 1); the water to be treated flows, in this case, in the conduit 11 at a variable flow rate.

The derivative conduit 11' removes at point A a portion of the water flow circulating in the principal conduit 11, brings this water to be treated through dissolution means 3 arranged in the branch conduit 11' and the water flow rate thus ozonized is then returned to the conduit 11, at point B. Compression means 6' permit causing the water to circulate in the branch conduit 11'.

According to this embodiment, the injection of $CO_2$ is carried out by injection means 2 arranged downstream of the contact/homogenization means 5; mixing means 7 are then arranged downstream of this injection site of the carbon dioxide in the water, but upstream of the phase separation means 4.

Figure 3:
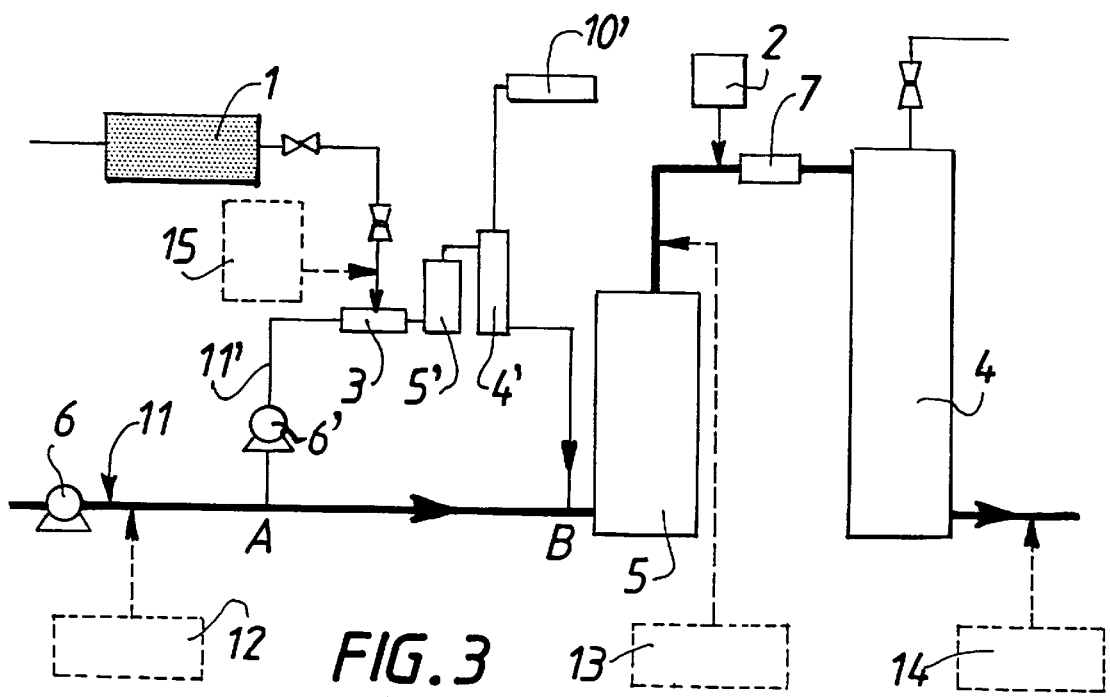

FIG. 3 shows an installation for the treatment of water analogous to that shown in FIG. 2, except that the latter comprises, moreover, first contact/homogenization means 5' and first phase separation means 4' arranged in the branch 11' and downstream of the dissolution means 3; the first phase separation means 4' being connected to thermal destruction means 10' of the undissolved ozone.

Figure 4:
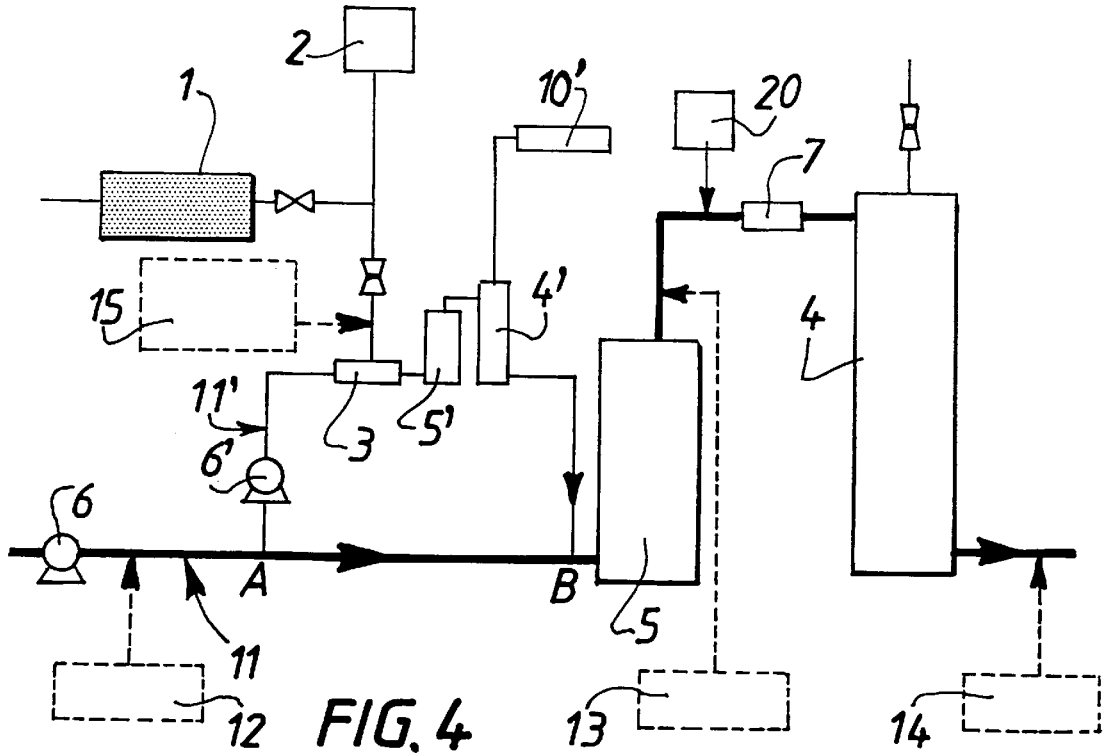

FIG. 4 shows an installation for the treatment of water analogous to that shown in FIG. 3, except that, according to this embodiment, the ozone and the carbon dioxide are injected into the water to be treated, via dissolution means 3, in the form of a gaseous mixture.

Moreover, subsidiary gas injection means 20, arranged upstream of the mixing means 7, permit carrying out an injection into the water of a vector gas, such as oxygen, nitrogen or air, which vector gas permits eliminating the undissolved gases (particularly ozone).

Figure 5:
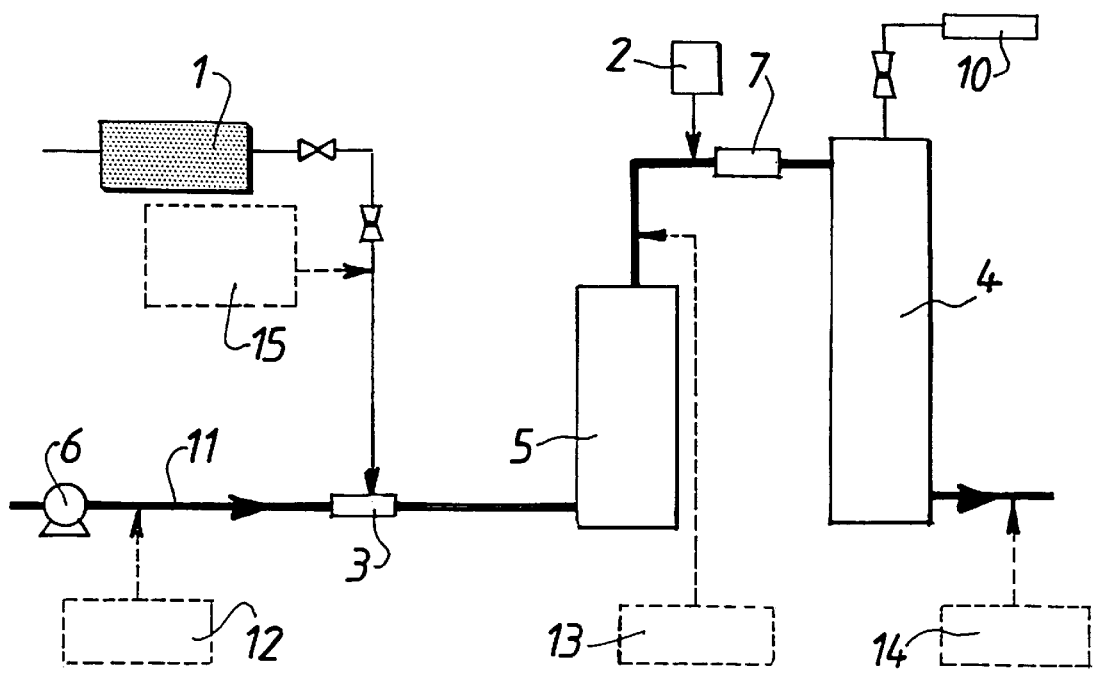

FIG. 5 shows an installation for treating water analogous to that shown in FIG. 1, except that, according to this embodiment, the deozonization means B have been omitted. Moreover, the injection of carbon dioxide takes place as in the embodiment of FIG. 2.

Figure 6:
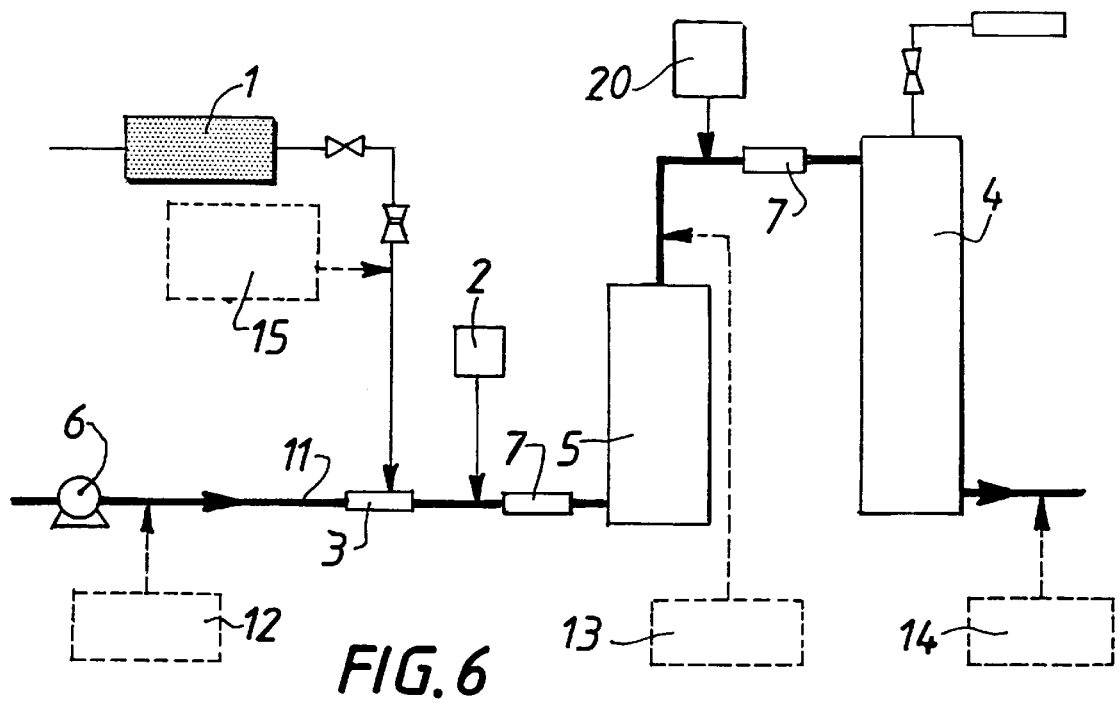

FIG. 6 shows an installation for the treatment of water analogous to that shown in FIG. 5, except for the fact that, according to this embodiment, the injection of carbon dioxide takes place according to the embodiment of FIG. 1 and that the subsidiary injection means 20 of gas permit carrying out an injection into the water of a vector gas, as shown in FIG. 4.

What is claimed is:

1. A process for the treatment of water circulating in a conduit, which water carries microorganisms to be eliminated and ions likely to lead to formation of scale on the internal wall of said conduit, comprising:
   a) measuring at least the flow rate, the temperature and an inlet pH of the water to be treated;
   b) measuring at least an outlet pH of treated water;
   c) determining a reference pH from at least one of the parameters measured in step a);
   d) determining by comparison of the reference pH determined in step c) and of the outlet pH measured in step b), the proportion of gas containing carbon dioxide ($CO_2$) to be injected into the water to be treated;
   e) determining a reference ozonation value from at least one of the parameters measured in step a);
   f) determining, as a function of the reference ozonation value of step e), the proportion of gas containing ozone ($O_3$) to be injected into the water to be treated; and
   g) adjusting the pH of the water and eliminating at least one portion of the microorganisms contained in said water, by injecting into the water to be treated a gas containing the ozone determined in step f) and the proportion of gas containing carbon dioxide determining in step d).

2. Process according to claim 1, wherein, in step a), there is also measured at least one of the parameters selected from the group consisting of complete alkalimetric titre (CAT) and hydrotimetric titre (HT).

3. Process according to claim 1, wherein in step b) there is measured also at least one of the parameters of the group consisting of residual ozone ($RO_3$), residual oxygen ($RO_2$) and redox potential.

4. Process according to claim 1, wherein the reference ozonation value is selected from the group consisting of treatment rate (TR), residual ozone ($RO_3$) and product of CxT.

5. Process according to claim 1, wherein the injection of the gases into the water to be treated is carried out by means of dissolution of the gases in the water.

6. Process according to claim 1, wherein after injection of the gases into the water to be treated, at least one portion of the undissolved gases is eliminated by undissolved gas separation means.

7. Process according to claim 1, wherein the undissolved gases are eliminated by a gas vector containing at least one of nitrogen and oxygen.

8. Process according to claim 1, wherein after injection of the gases in the water to be treated, the undissolved gases are recovered.

9. Process according to claim 1, wherein in step c), the reference pH is determined at least from at least one of the temperature and inlet pH of the water to be treated.

10. Process according to claim 1, wherein in step d), the proportion of gas containing carbon dioxide injected into the water to be treated is determined, permitting returning the outlet pH to a value substantially equal to the reference pH value.

11. Process according to claim 1, wherein in step e), the reference ozonation value is determined at least from at least one of the temperature and the flow rate of the water to be treated.

12. Process according to claim 1, wherein in step f), the proportion of ozone to be injected is determined from at least one of the parameters measured in step b) in the treated water.

13. Process according to claim 1, wherein the pressure of the water to be treated is maintained in the range from $10^5$ Pa to $10^6$ Pa.

14. Process according to claim 1, wherein the water to be treated has a temperature of 1° C. to 80° C. and circulates in a hospital building.

15. Process according to claim 1, wherein the water to be treated flows in a channel connected to at least one heat exchanger.

* * * * *